No. 767,642. Patented August 16, 1904.

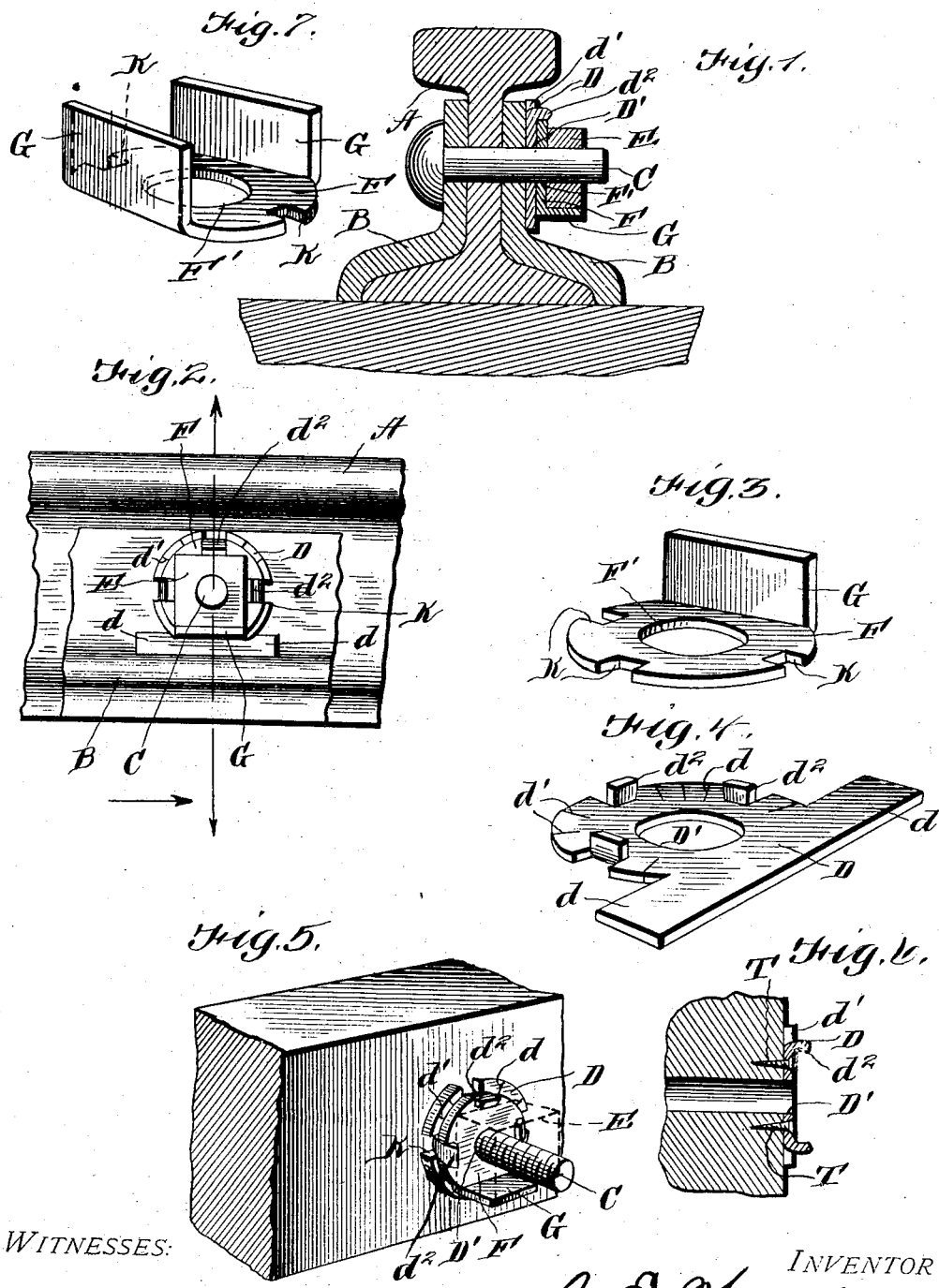

UNITED STATES PATENT OFFICE.

JOSEPH ELBERT HART, OF THOMAS MILLS, TENNESSEE.

NUT-LOCK.

SPECIFICATION forming part of Letters Patent No. 767,642, dated August 16, 1904.

Application filed February 26, 1904. Serial No. 195,427. (No model.)

*To all whom it may concern:*

Be it known that I, JOSEPH ELBERT HART, a citizen of the United States, residing at Thomas Mills, in the county of Anderson and State of Tennessee, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks, and comprises a lock in which two washers for use in connection with the bolt and nut, one of which washers is adapted to rotate with the nut and provided with a series of peripheral radiating recesses for the reception of a portion of the other washer, which is adapted to be fastened to the rail or other object to which the bolt and nut are applied, thereby producing an efficient lock for a nut and one which may be simple in construction and which may be easily and quickly applied.

The invention comprises various details of construction, which will be hereinafter fully described and then specifically defined in the appended claims.

I illustrate my invention in the accompanying drawings, which, with the letters of reference marked thereon, form a part of this application, in which—

Figure 1 is a cross-sectional view showing my nut-lock applied to a railway-rail and fish-plate. Fig. 2 is a side view of the nut-lock as applied to a railway-rail. Fig. 3 is a detail perspective of one of the washers which rotates with the nut. Fig. 4 is a perspective view of the washer which is stationary and adapted to hold the washer which rotates with the nut. Fig. 5 is a modified view showing the washer fastened to a wooden framework. Fig. 6 is a detail sectional view of the locking-washer, and Fig. 7 is a detail view of a slightly-modified form of locking-washer.

Reference now being had to the details of the drawings by letter, A designates a railway-rail, B fish-plates, and C a threaded bolt passing through the shank of the rail and said fish-plates.

D designates a washer, a detail of which is shown in Fig. 4 of the drawings, which washer has a central aperture $D'$ and oppositely-disposed arms $d$, the flat outer edges of which portion are continuous and are adapted to rest upon the fish-plate, as shown clearly in Figs. 1 and 2 of the drawings, and thereby prevent the washer from turning upon the bolt which passes through said aperture $D'$. The circular-outlined portion of said washer D is provided with a series of radial slits $d'$, which extend from one projection $d$ to the other and producing a series of fingers $d^2$ intermediate said slits, which may be turned at right angles, as shown in Fig. 4 of the drawings, for the purpose of locking the nut, as will be presently described.

The nut E is of usual construction and is mounted upon the threaded portion of the bolt, and F designates a second washer centrally apertured, as at $F'$, and has a right-angled portion G, which is adapted to engage over one of the faces of the nut E, as shown in Fig. 1 of the drawings, and is designed to be fitted over the bolt and to turn with the nut as the latter is screwed upon the bolt. About the marginal edge of the apertured portion of the washer F are recesses K, which are designed to receive one or the other of the fingers $d^2$ of the washer D after the nut has been screwed tight, whereby the washer F and also the nut are prevented from rotation independent of the washer D. By reason of the slits in the washer D being near together it will be observed that should the nut become loose from any cause it may be tightened and a new finger inserted in one or the other of the recesses in the washer F.

In Fig. 5 I have shown a slight modification of my improved nut-lock in which I dispense with the oppositely-disposed projections $d$ shown in Fig. 4 and in which view I have shown my nut-lock as applied to a wooden beam, as it is my purpose to apply my lock to all kinds of work, either railways or machinery, &c. In Fig. 6 screws T are employed which pass through apertures in the washer F, it being understood that said screws serve the same purpose as the lugs D when the washer is used in connection with fish-plates and provided for the purpose of holding the washer D stationary.

While I have shown a particular construction of nut-lock embodying the features of my invention, it will be understood that I may make alterations in certain details of construction without in any way departing from the spirit of the invention.

Having thus described my invention, what I claim as new, and desire to secure by Letters Patent, is—

1. A nut-lock comprising in combination with a bolt and nut, a stationary washer mounted upon said bolt and having a series of radial slits about its periphery forming a series of flexible fingers about the edge of the washer, combined with a movable washer mounted upon the bolt and having an angled portion extending over one face of the nut and adapted to rotate therewith, said fingers upon the stationary washer designed to engage recesses in the movable washer, as set forth.

2. A nut-lock comprising in combination with a bolt and nut, a stationary washer having oppositely-projecting portions adapted to engage a stationary object to prevent the washer from turning, a portion of said washer having a series of radial slits in its circumference, combined with a movable washer, a portion of which is bent at an angle over the edge of the nut and adapted to rotate therewith, the spaces intermediate said slits of the stationary washer being adapted to be turned at an angle into recesses in the marginal edge of the movable washer, as shown and described.

In testimony whereof I hereunto affix my signature in presence of two witnesses.

JOS. ELBERT HART.

Witnesses:
J. R. DAVENPORT,
ANDREW COOPER.